United States Patent [19]

Taggart, Jr.

[11] Patent Number: 4,486,052
[45] Date of Patent: Dec. 4, 1984

[54] DEVICE TO PERMIT MOVEMENT OF VEHICLE NOT HAVING FRONT OR REAR AXLE

[76] Inventor: Harry L. Taggart, Jr., 4031 MacArthur Ave., Richmond, Va. 23227

[21] Appl. No.: 351,283

[22] Filed: Feb. 22, 1982

[51] Int. Cl.³ .................. B60B 35/02; B60B 35/04; B60B 35/10
[52] U.S. Cl. .................. 301/130; 301/124 R; 301/124 H; 16/30
[58] Field of Search .............. 301/124 R, 128, 130, 301/132, 135, 124 H; 16/30; 190/18 A

[56] References Cited

U.S. PATENT DOCUMENTS

| | | | |
|---|---|---|---|
| 1,076,471 | 10/1913 | Vanskiver | 301/130 |
| 1,139,182 | 5/1915 | Henthorn et al. | 301/130 |
| 1,300,034 | 4/1919 | Shambaugh | |
| 1,410,863 | 3/1922 | Woodson | 301/130 |
| 1,463,824 | 8/1923 | Leuvelink | 301/130 X |
| 1,953,636 | 4/1934 | Skelton | 16/30 |
| 2,179,912 | 11/1939 | Woodruff | 16/30 X |
| 3,324,701 | 6/1967 | Shultz | 72/393 |
| 3,473,819 | 10/1969 | Tantlinger et al. | 301/132 X |
| 3,915,504 | 10/1975 | Bauer | 301/130 |

Primary Examiner—David A. Scherbel
Attorney, Agent, or Firm—Saidman, Sterne & Kessler

[57] ABSTRACT

A device for mounting a wheel to a vehicle having a housing for an axle, the device including a shaft, the shaft having a first end insertable into the housing and comprising a device for frictionally engaging an inner wall of the housing, a second end of the shaft comprising a support for mounting a wheel thereon. In one preferred embodiment, the frictional engaging device is threadably received on the first end of the shaft for expanding into contact with the inner wall of the housing in response to rotation of the shaft in a first direction and for contracting in response to rotation of the shaft in a second direction. In an alternate embodiment, the device comprises a disk mounted on the end of the shaft and adapted to come into frictional engagement with the inner wall of the housing by the weight of the vehicle.

17 Claims, 8 Drawing Figures

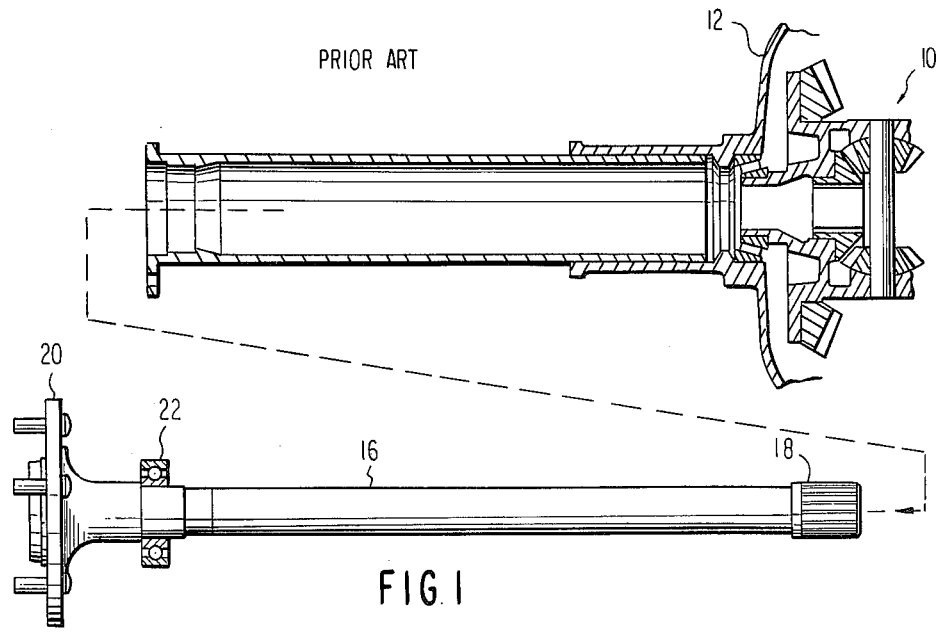
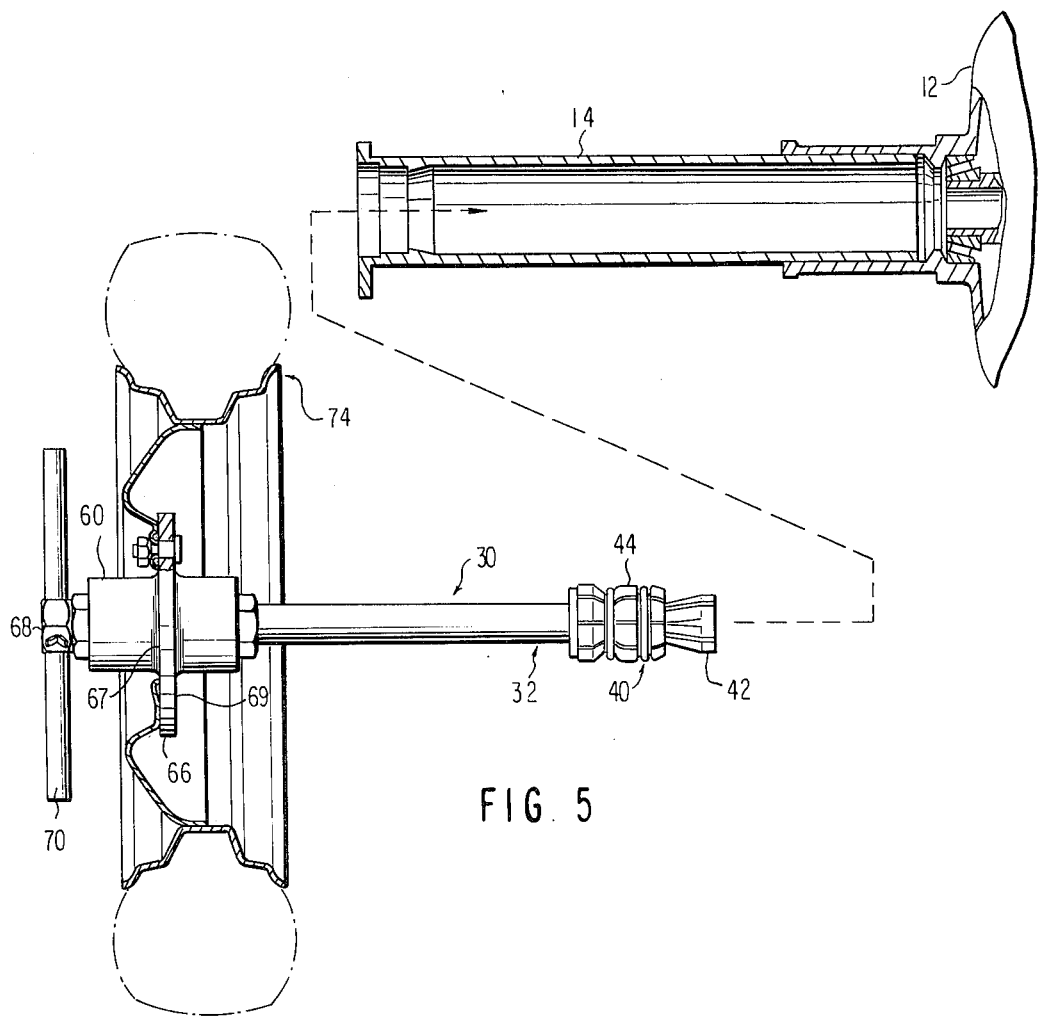

DEVICE TO PERMIT MOVEMENT OF VEHICLE NOT HAVING FRONT OR REAR AXLE

BACKGROUND OF THE INVENTION

1. Field Of The Invention

This invention relates to devices for mounting wheels to a vehicle which has had one or more of its axles removed.

2. Description Of The Related Art

Vehicles, such as automobiles, will often develop difficulties attributable to a faulty front or rear axle assembly. Repair of an axle normally requires that it be removed from the vehicle and sent to a machine shop. For the period of time that the axle is removed from the vehicle, the vehicle is, of course, immobile. This presents somewhat of a problem when the vehicle is on a lift, or occupying other valuable space in a repair shop since until the axle is repaired and replaced on the vehicle, the immobile vehicle interferes with productive use of the valuable space and equipment which it occupies.

It sometimes occurs during travel that a vehicle becomes disabled, requiring that it be towed some distance to a repair facility. On some such occasions, one or more of the axles of the vehicle may be so faulty as to make it unsafe to attempt to tow the vehicle on that axle. This presents a rather serious problem, and towing of the vehicle generally requires rather costly and cumbersome equipment.

In situations such as those described above, it would be highly desirable to be able to move the vehicle in question easily and safely, in a manner not requiring substantial labor or excessive equipment costs.

Certain known devices are adapted to temporarily repair a broken axle while it is on a vehicle. U.S. Pat. No. 1,076,471 to Vanskiver discloses a sleeve-like device which is fitted to the end of a broken axle and provides a temporary spindle for mounting a wheel to the vehicle. This device requires a collar for maintaining it in position on the axle, and requires at least some tools for its installation. The device is suitable only for use with a vehicle having an axle, albeit a broken one, associated therewith.

U.S. Pat. No. 1,139,182 to Henthorn et al. discloses an emergency axle extension similar to that of Vanskiver. Like the Vanskiver device, the Henthorn device may be used only in conjunction with a broken axle still affixed to the vehicle, and requires that tools be available for mounting the device to the broken axle.

Shambaugh, U.S. Pat. No. 1,300,034, discloses an emergency hub which is attached to the axle housing of a vehicle. Although this device need not be attached to the axle per se, it does require that the housing have a flange of suitable size with an aperture therein compatable with a bolt and retaining member for the hub. The Shambaugh device includes a sleeve member which must be snugly received within the axle housing of the vehicle. The dimensions of the sleeve member, retaining member and bolt means of the emergency hub must therefore be particularly adapted to the vehicle on which it is to be mounted. The axle housing must also be substantially in the configuration of a right circular cylinder. These drawbacks substantially limit the usefulness of a device as disclosed in this patent.

U.S. Pat. No. 3,915,504 to Bauer discloses a clamp-on device for providing a temporary replacement spindle on a non-rotatable axle from which the original spindle has fractured. Disclosed is a device which must be bolted to the exterior of the remaining portion of the axle.

Tantingler et al., U.S. Pat. No. 3,473,819, disclose a plug-in wheel which may be easily mounted to a bulky object, such as a storage container. However, a device in accordance with this disclosure is not at all useful in conjunction with a vehicle, such as an automobile.

Thus, the prior art has not provided a device which may be readily used in conjunction with vehicles, such as automobiles or the like, of various sizes and configurations, for mounting a wheel to such a vehicle which has had its axle removed.

Accordingly, it is an object of the present invention to overcome limitations and disadvantages associated with prior art devices in the nature of those discussed above.

It is an object of the present invention to provide a device capable of mounting a wheel to a vehicle which has had its axle removed.

It is an object of the present invention to provide means facilitating movement and towing of a vehicle which is without one or more of its axles.

Another object of the present invention is to provide means, for temporarily mounting a wheel to a vehicle which is without an axle, which may be easily and effectively secured to the vehicle and which does not require tools or other accessories for securing it to the vehicle. The present invention provides such means which are convenient and easy to use, and relatively low in cost.

A further object of the present invention is to provide a device which will facilitate greater productive use of valuable vehicle repair space and equipment.

SUMMARY OF THE INVENTION

The present invention comprises a device for mounting a wheel to a vehicle having a housing with an inner wall adapted to receive an axle, the device comprising a shaft having a first end and a second end, said first end insertable into the housing, the device comprising retaining means for frictionally engaging the inner wall of the housing, the second end of the shaft comprising means for mounting a wheel on the shaft. The shaft and retaining means are smaller than the internal dimension of the housing, whereby the shaft and retaining means may be freely inserted into the housing, the retaining means being adapted to be brought into contact with the inner wall of the housing.

In one embodiment of the present invention, the retaining means comprises a disk secured to the shaft at the first end thereof. The disk has a diameter smaller than the internal dimension of the housing, and is brought into engagement and held in frictional contact with inner wall of the housing by the weight of the vehicle.

In another embodiment of the present invention, the retaining means comprises an expander associated with the shaft at the first end thereof. The expander comprises a wedge associated with the shaft, and at least one engaging element associated with the wedge and adapted to frictionally engage the inner wall of the housing.

The wedge may be threadedly engaged with the shaft, whereby rotation of the shaft relative to the wedge causes movement of the wedge longitudinally of the shaft, such longitudinal movement causing expansion of the expander. In a particular embodiment disclosed herein, the expander comprises a wedge threadedly engaged with the shaft, which wedge includes plural surfaces inclined relative to the longitudinal axis of the shaft, a plurality of engaging elements disposed about the wedge and adapted to engage respective ones of the plural inclined surfaces, means disposed about the engaging elements for yieldably retaining the elements about the wedge and the shaft in positions relatively close to the shaft, whereby rotation of the shaft relative to the wedge causes movement of the wedge longitudinally of the shaft, thereby causing movement of the engaging elements outwardly from the shaft.

In a preferred embodiment of the present invention, the means for mounting a wheel to the shaft comprises means for rotatably mounting the wheel on the shaft.

In accordance with yet another aspect of the present invention, the device may further comprise means for aligning the axis of the shaft with the axis of the housing. Such aligning means may comprise a spacer insertable into the housing and associated with the shaft at a position axially spaced from the retaining means.

In accordance with the present invention, means may be associated with the second end of the shaft for rotating the shaft within the housing.

The device of the present invention may comprise two or more expanders associated with the shaft. Means may extend between adjacent expanders for causing the wedge of each expander to move longitudinally of the shaft upon rotation thereof. The means extending between expanders comprises a thrust member abutting proximate ends of adjacent expanders. In a preferred embodiment, the thrust member comprises a tube surrounding a portion of the shaft.

BRIEF DESCRIPTION OF THE DRAWINGS

The foregoing features and objects of the present invention will be best understood in light of the following description of preferred embodiments in conjunction with the accompanying drawings, in which:

FIG. 1 illustrates a conventional vehicle axle housing and associated axle assembly, the latter being removed from the housing;

FIG. 5 illustrates the device of FIG. 2, having a wheel associated therewith, prior to insertion into the axle housing of a vehicle;

DETAILED DESCRIPTION OF PREFERRED EMBODIMENTS

Figure 6:
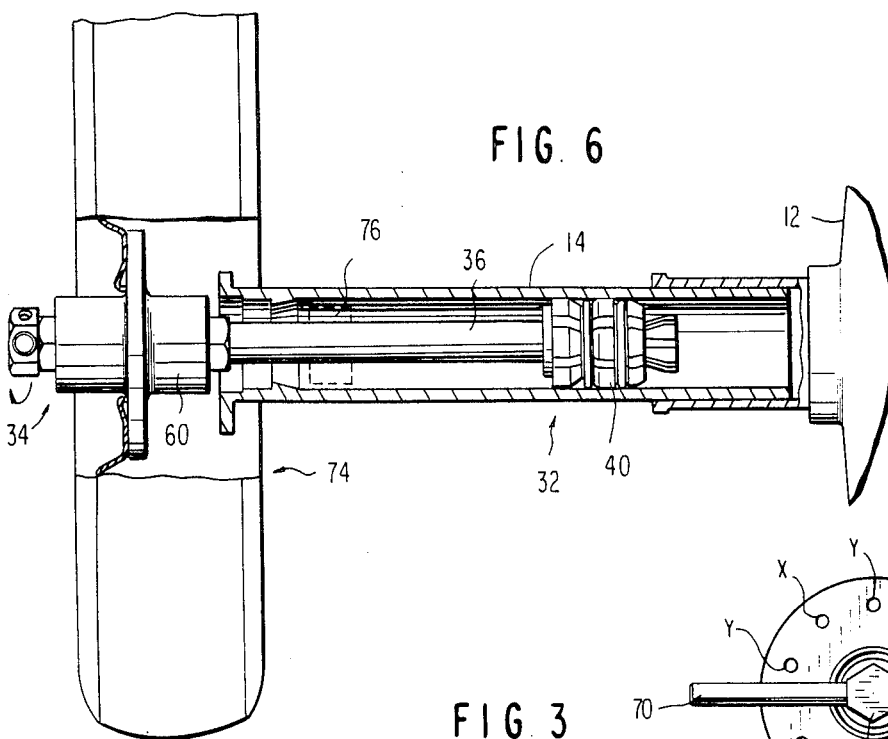
FIG. 6 illustrates the device in FIG. 2 inserted and secured within the axle housing.

FIG. 1 illustrates a conventional axle assembly and housing normally associated with a vehicle, such as an automobile, in a known manner. A differential gearing assembly, generally designated by reference numeral 10, is housed within a differential housing 12. An axle housing 14, generally of elongated shape, is affixed to and extends from differential housing 12. An axle 16 is normally received within housing 14, and has a mating end 18 for meshing with differential gearing 10. A flange 20 is associated with the other end of axle 16 for mounting a wheel, brake drum, etc. A bearing 22, associated with axle 16, is received within housing 14 for rotatably supporting axle 16 therein. FIG. 1 illustrates axle 16 removed from housing 14 for repair or for some similar purpose.

Figure 3:
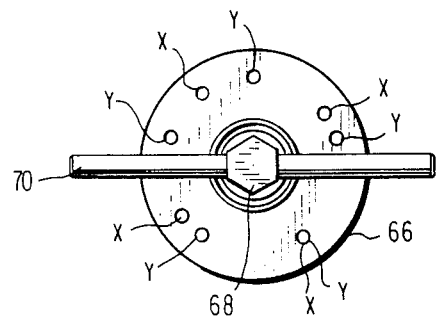
FIG. 3 is an end view of the device in FIG. 2, generally in the direction of arrow 3 of FIG. 2.
Figure 2:
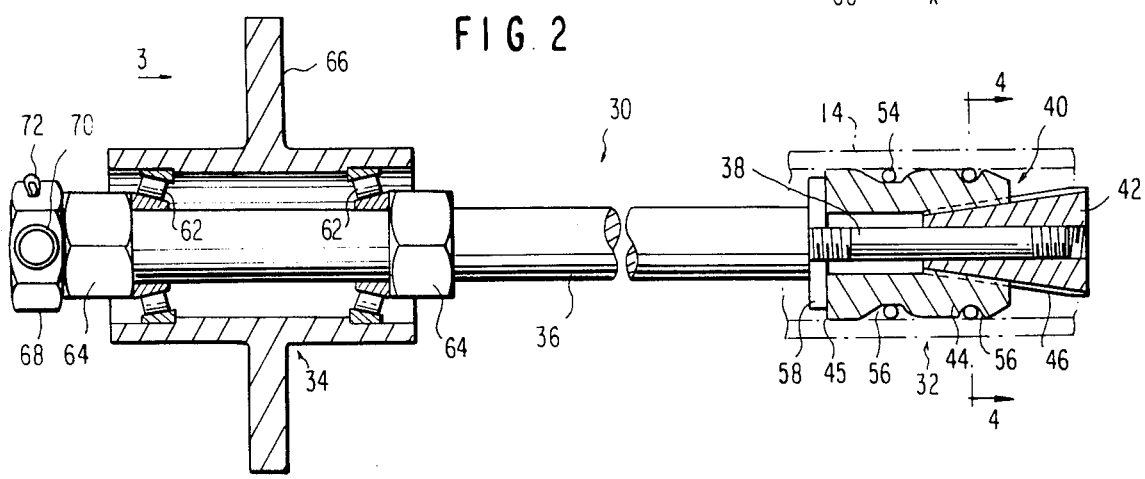
FIG. 2 illustrates a first preferred embodiment of the present invention.
Figure 4:
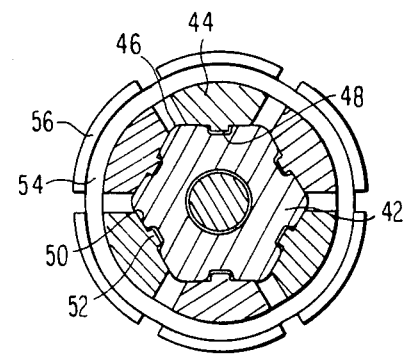
FIG. 4 is a sectional view of the expander means associated with the device in FIG. 2, taken along line 4—4 of FIG. 2.

FIGS. 2-4 illustrate a first embodiment of the present invention. The device, designated by reference numeral 30 in FIG. 2, comprises a first end 32, adapted to be inserted into an axle housing of a vehicle, and a second end 34 generally adapted to mount a wheel thereon.

Device 30 comprises a shaft 36 having a threaded end portion 38 at first end 32. An expander 40 includes a wedge 42 threadedly received on threaded end portion 38. An engaging element 44, or several engaging elements, are in contact with wedge 42. Expanders as shown at 40 are manufactured by K-D Tool Co. and described in U.S. Pat. No. 3,324,701.

As illustrated in FIGS. 2 and 4, wedge 42 has a generally tapered shape including a plurality of flattened surfaces 46. Each surface 46 includes a slot 48 extending longitudinally of wedge 42. Each engaging element 44 includes a surface 50 and a key 52 which respectively cooperate with surfaces 46 and slots 48 of wedge 42. Cooperation of such surfaces, keys and slots allow relative longitudinal movement of wedge 42 and elements 44 while preventing rotation of wedge 42 relative to engaging elements 44.

A pair of resilient bands 54 are seated within a corresponding pair of annular recesses 56 formed on the outer surfaces of engaging elements 44. Bands 54 may comprise resilient rubber, looped coil springs, or the like, and serve to bias engaging elements 44 into positions closely adjacent shaft 36 and in contact with wedge 42. An end 45 of each engaging element 44 contacts an abutment washer or surface 58.

A hub 60 is rotationally mounted on shaft 36 generally adjacent second end 34 thereof. Hub 60 is rotationally mounted on a pair of bearings 62, of any suitable type, retained on shaft 36 by a pair of nuts 64. Hub 60 includes a flange 66 for mounting a wheel to device 30.

As seen in FIG. 3, flange 66 preferably has a plurality of holes spaced thereabout and adapted to mount wheels of varying types to the device. For example, a series of holes X are positioned for securing a 4-hole wheel to flange 66, while a series of holes Y are positioned for mounting a 5-hole wheel.

A retaining nut 68 secures a handle 70 to second end 34 of device 30. Handle 70 is received in an aperture within nut 68, and may be retained therein by means such as a cotter pin 72. Handle 70 may also be formed integrally with retaining nut 68.

FIG. 5 illustrates, in part, the manner in which the device of the present invention may be used to mount a wheel to a vehicle which has had its axle removed therefrom. FIG. 5 depicts a wheel and tire, generally designated by reference numeral 74, bolted to flange 66 of hub 60 of device 30. Wheel 74 is shown in FIG. 5 attached to the left surface 67 of flange 66. Assembly of wheel 74 to flange 66 in this manner may require handle 70 to be removed from device 30 in order that wheel 74 might be positioned over the left side of hub 60, as shown in FIG. 5. However, if the profile of wheel 74 permits, wheel 74 might be secured to the right surface 69 of flange 66. In that event, first end 32 of device 30 may be passed through the aperture in the center of wheel 74 without requiring disassembly of any portion of device 30.

FIG. 5 illustrates expander 40 in a contracted condition. Wedge 42 is positioned at the left-most portion of threaded end 38 of shaft 36 and resilient bands 54 are retaining engaging elements 44 in positions relatively close to shaft portion 38.

In this condition, expander 40 has an outer diameter smaller than the inner dimension of axle housing 14, and may be freely inserted therein.

After insertion of first end 32 of device 30 into housing 14, shaft 36 is rotated in a clockwise direction. Handle 70 facilitates easy rotation of the device. At least some of engaging elements 44 contact an inner wall portion of axle housing 14, restraining rotational movement of expander 40. As shaft 36 continues to rotate, expander 40, including wedge 42 threadedly received on portion 38 of shaft 36, moves longitudinally of shaft 36, to the left as viewed in FIG. 2. End portions 45 of engaging elements 44 abut washer 58, restraining longitudinal movement of elements 44. As wedge 42 continues to move longitudinally of shaft 36, interaction of inclined surfaces 46 and 50 force engaging elements 44 radially outwardly against the bias of resilient bands 54. As they move outwardly, all engaging elements 44 contact an inner wall portion of housing 14, securely positioning device 30 by means of frictional forces. The outer surfaces of engaging elements 44 may be serrated, or otherwise roughened, for the purpose of enhancing frictional engagement of engaging elements 44 with axle housing 14.

When expander 40 is fully in contact with an inner wall portion of axle housing 14, as illustrated in FIG. 6, the device is securely fixed to the vehicle, which may then be safely moved while resting on wheel 74.

When the vehicle is resting on wheel 74, the weight of the vehicle will force end 34 to move within housing 14, upwardly as viewed in FIG. 6. This will result in misalignment of the axes of shaft 36 and housing 14, respectively. This misalignment has not been found to be detrimental for most applications of the present device. It is perfectly safe and convenient to move even a heavily laden full size vehicle on wheel 74 despite misalignment of these axes.

In some instances, however, it is desirable to maintain the axis of shaft 36 in alignment with the axis of axle housing 14. For instance, when one is towing a vehicle having a wheel mounted thereto as illustrated in FIG. 6, it is desirable to maintain wheel 74 in proper alignment for safer and improved handling, as well as for improved tire wear. For this purpose, an optional spacer 76 may be provided on shaft 36 for maintaining the axis of shaft 36 substantially in alignment with the axis of axle housing 14. Spacer 76 may take the form of a disk of metal, hard rubber, or the like, of a diameter which is substantially equal to the internal dimension of housing 14. Of course, it is necessary that the diameter of spacer 76 be sufficiently small so that it may be freely inserted into housing 14. Spacer 76 may be positioned over and secured to shaft 36 in any convenient manner.

Figure 7:
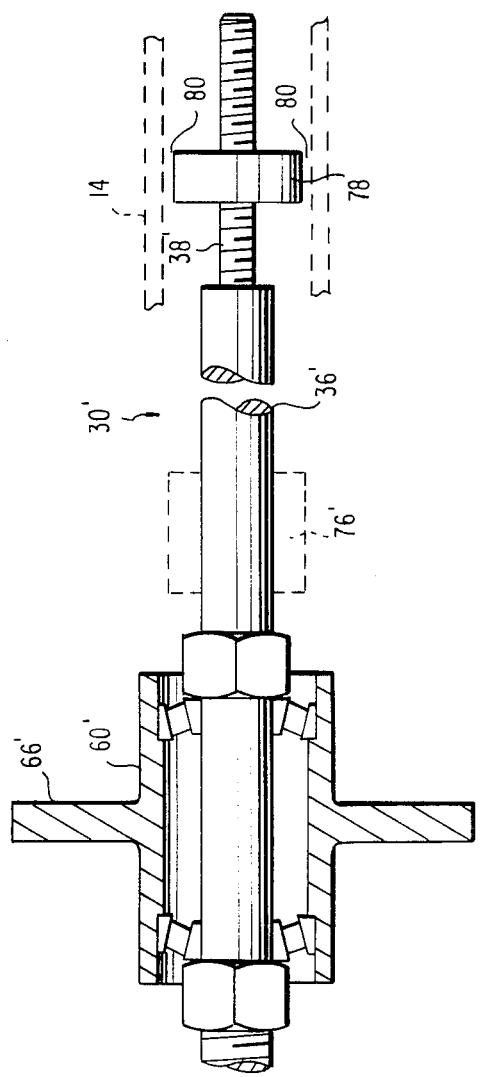
FIG. 7 illustrates a second preferred embodiment of the present invention.

FIG. 7 illustrates an alternate embodiment 30' of the present invention. This embodiment is substantially similar in many respects to the embodiment described in FIG. 2, having a shaft 36', a threaded end portion 38', a hub 60' including a flange 66' rotationally mounted on shaft 36' in the manner previously described with reference to FIG. 2. The frictional engaging means of the embodiment of FIG. 7 comprises a disk 78 which is attached to threaded end portion 38'. Disk 78 has an outer diameter sufficiently small so as to be freely insertable into axle housing 14. Once within housing 14, a peripheral gap or clearance 80 will exist between the outer periphery of disk 78 and an inner wall of housing 14. When the weight of the vehicle is allowed to rest on a wheel associated with flange 66', the forces acting on device 30' will force disk 78 into frictional contact with an inner wall of housing 14, thus retaining device 30' in place within housing 14. An optional spacer 76' may be provided, in the manner previously described with respect to FIG. 6, for maintaining device 30' substantially in alignment with the axis of housing 14. It may also be necessary or desirable to provide interchangeable disks 78 of varying size to more effectively engage housings 14 of different dimensions. It is also desirable to provide a roughened peripheral surface for disk 78 to enhance the frictional engagement thereof with housing 14.

Because the embodiment of device 30' need not be rotated within housing 14 in order to secure the same therein, it is not necessary to provide means, such as handle 70, for rotating this embodiment. The device of FIG. 7 is therefore somewhat more compact, and of a configuration which is more easily handled and stored. Additionally, absence of means such as handle 70 facilitates easy attachment of a wheel to flange 66'.

Figure 8:
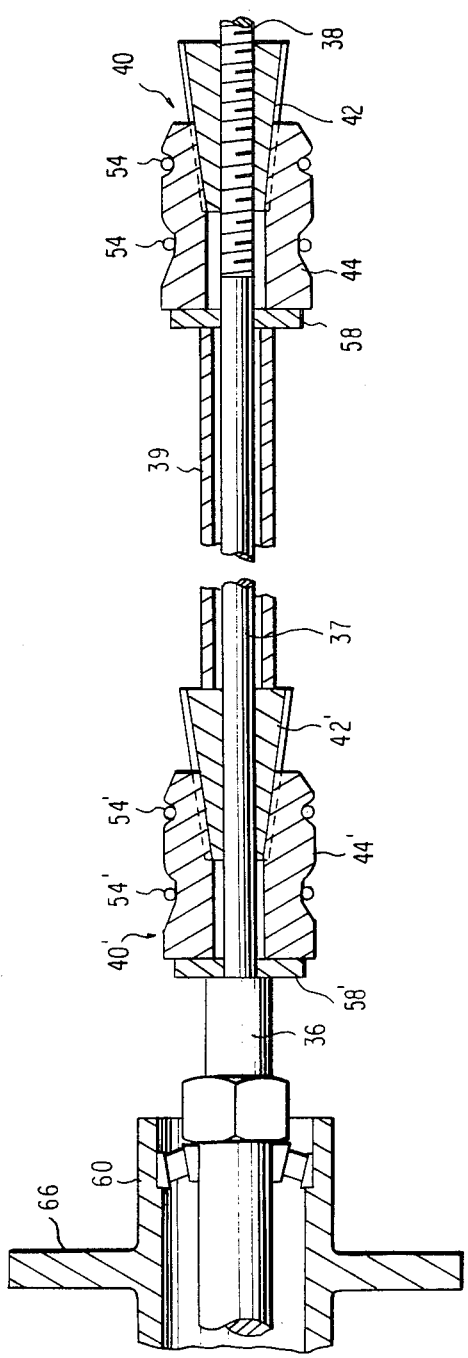
FIG. 8 illustrates another embodiment of the invention including two expanders.

FIG. 8 illustrates yet another embodiment of the present invention including a pair of expanders 40 and 40'. The structure of expander 40' is identical to that of expander 40, like parts being designated by like primed reference numerals. The singular difference between expander 40 and expander 40' is that, while wedge 42 is threadedly engaged with shaft portion 38, wedge 42' is freely slidable on a reduced diameter portion 37 of shaft 36.

A thrust tube 39 surrounds reduced shaft portion 37 and extends between wedge 42' and abutment washer 58 associated with expander 40. Upon rotation of shaft 36, wedge 42, threadedly engaged with portion 38, will move to the left pushing elements 44, washer 58, thrust tube 39, wedge 42' and elements 44' against an abutment washer 58'. This will cause expanders 40 and 40' to expand outwardly into engagement with the axle housing, as previously described.

It will be evident that, since two expanders are associated with shaft 36 and engage the axle housing, a device in accordance with the embodiment of FIG. 8 will be securely positioned substantially parallel to the axis of the housing. Thus, a spacer, such as that shown at 76 or 76' in FIGS. 6 and 7, respectively, is unnecessary. Also, it is to be understood that a device in accordance with the present invention could also comprise three or more expanders if necessary or desirable.

The devices illustrated in FIGS. 2, 7 and 8, will generally be of a length of 10-12 inches or more for use with a conventional rear axle housing of the type illustrated in FIG. 1. For front wheel drive vehicles, the length of shaft 36 extending outwardly from hub 60 will be shortened substantially, so as to be substantially fully received within the relatively shorter front axle housings of such vehicles. In this case, shaft 36 will extend from hub 60 approximately 2-6 inches, a length sufficient to accommodate an expander 40 or a disk 78. It is to be understood that these dimensions are only exemplary, and are not to be construed as limiting. A device in accordance with the present invention may assume any dimensions compatable with a vehicle to which it is secured.

While the present invention has been disclosed with reference to the accompanying drawings, the same are not to be construed as limiting, and the invention should not be deemed to be limited to details disclosed herein, the scope of the invention being defined solely by the claims appended hereto, and including the disclosed embodiments and all equivalents thereto encompassed within the claims.

I claim:

1. A device for mounting a wheel to a vehicle, the vehicle having a housing with an inner wall adapted to receive an axle therewithin, said device comprising:

a shaft having a first end and a second end, said first end insertable into the housing;

means for retaining the device comprising means for frictionally engaging the inner wall of the housing; and said second end of said shaft comprising means for mounting a wheel on said shaft;

wherein said shaft and said retaining means are smaller than the internal dimension of the housing, whereby said shaft and retaining means may be freely inserted into said housing, said retaining means being adapted to be brought into contact with the inner wall of the housing;

wherein said retaining means comprises a disk secured to said shaft at said first end thereof;

wherein said disk has a diameter smaller than the internal dimension of the housing, said disk being brought into engagement and held in frictional contact with the inner wall of the housing by the weight of the vehicle.

2. A device as in claim 1, wherein said means for mounting a wheel comprises means for rotatably mounting the wheel on said shaft.

3. A device as in claim 1, further comprising means associated with the second end of said shaft for rotating said shaft within the housing.

4. A device as in claim 1, further comprising means for aligning the axis of said shaft with the axis of the housing.

5. A device as in claim 4, wherein said aligning means comprises a spacer insertable into the housing and associated with said shaft at a position axially spaced from said retaining means.

6. A device for mounting a wheel to a vehicle, the vehicle having a housing with an inner wall adapted to receive an axle therewithin, said device comprising:

a shaft having a first end and a second end, said first end insertable into the housing;

means for retaining the device comprising means for frictionally engaging the inner wall of the housing; and said second end of said shaft comprising means for mounting a wheel on said shaft;

wherein said shaft and said retaining means are smaller than the internal dimension of the housing, whereby said shaft and retaining means may be freely inserted into said housing, said retaining means being adapted to be brought into contact with the inner wall of the housing;

wherein said retaining means comprises an expander associated with said shaft at said first end thereof;

wherein said expander comprises:

a wedge associated with said shaft; and at least one engaging element associated with said wedge and adapted to frictionally engage the inner wall of the housing;

wherein said wedge is threadedly engaged with said shaft, whereby rotation of said shaft relative to said wedge causes movement of said wedge longitudinally of said shaft, said longitudinal movement causing expansion of said expander; and further comprising at least two expanders associated with said shaft, and means extending between adjacent expanders for causing the wedge of each said expander to move longitudinally of said shaft upon rotation thereof;

wherein said means extending between expanders comprises a thrust member abutting proximate ends of adjacent expanders;

wherein said thrust member comprises a tube surrounding a portion of said shaft.

7. Temporary substitute means for a conventional axle assembly of a motor vehicle, said conventional axle assembly including an elongated axle having one end normally matable with the vehicle's differential gear and normally received within an elongated axle housing, a flange at the other end of the axle for mounting a wheel supporting a tire, and a bearing at said other end of the axle for rotatably supporting the axle in the axle housing, said means comprising an elongated shaft having a first end and a second end, said first end of said shaft insertable into said axle housing after said conventional axle assembly has been removed from said axle housing, said first end of said shaft including means for retaining said shaft in said axle housing comprising means for frictionally engaging the inner wall of said axle housing, and means formed at said second end of said shaft for mounting a wheel on said shaft, said mounting means comprising a hub, a wheel flange extending radially from said hub for mounting a wheel thereon, and bearings for rotatably coupling said second end of said shaft to said hub.

8. The invention as set forth in claim 7, wherein the length of said elongated shaft is slightly less than the length of said elongated axle so that said first end of said shaft will not interfere with the vehicle's differential gear after being inserted into the axle housing.

9. The invention as set forth in claim 7, wherein said retaining means comprises a disk secured to said shaft at said first end of said shaft.

10. The invention as set forth in claim 9, wherein said disk has a diameter smaller than the internal dimension of the housing, said disk being brought into engagement and held in frictional contact with the inner wall of the housing by the weight of the vehicle.

11. The invention as set forth in claim 7, wherein said retaining means comprises an expander associated with said shaft at said first end thereof.

12. The invention as set forth in claim 11, wherein said expander comprises:

a wedge associated with said shaft; and at least one engaging element associated with said wedge and adapted to frictionally engage the inner wall of the housing.

13. The invention as set forth in claim 12, wherein said wedge is threadedly engaged with said shaft, whereby rotation of said shaft relative to said wedge causes movement of said wedge longitudinally of said shaft, said longitudinal movement causing expansion of said expander.

14. The invention as set forth in claim 7, further comprising means for aligning the axis of said shaft with the axis of the housing.

15. The invention as set forth in claim 14, wherein said aligning means comprises a spacer insertable into the housing and associated with said shaft at a position axially spaced from said retaining means.

16. The invention as set forth in claim 15, wherein said spacer is positioned adjacent said second end of said shaft.

17. The invention as set forth in claim 7, further comprising means associated with said second end of said shaft for rotating said shaft within the housing.

* * * * *